United States Patent [19]

Stetson

[11] 4,161,763

[45] Jul. 17, 1979

[54] COMPACT VOLTAGE SURGE ARRESTER DEVICE

[75] Inventor: Earl W. Stetson, Pittsfield, Mass.

[73] Assignee: General Electric Company, New York, N.Y.

[21] Appl. No.: 890,254

[22] Filed: Mar. 27, 1978

[51] Int. Cl.[2] .......... H02H 9/06

[52] U.S. Cl. .......... 361/128

[58] Field of Search .......... 361/127, 128; 338/20

[56] References Cited

U.S. PATENT DOCUMENTS 3,778,743 12/1973 Matsuoka et al. .......... 338/20

*Primary Examiner*—Harry E. Moose, Jr.

*Attorney, Agent, or Firm*—Francis X. Doyle; Richard A. Menelly

[57] ABSTRACT

A compact voltage surge arrester employs a miniature series gap electrode arrangement in series with a plurality of zinc oxide varistors. The series gap arrangement provides the use of zinc oxide varistors without auxiliary heat sinks.

1 Claim, 5 Drawing Figures

PRIOR ART

COMPACT VOLTAGE SURGE ARRESTER DEVICE

BACKGROUND OF THE INVENTION

Voltage surge arresters currently employed as station arresters and distribution arresters generally consist of the series combination of a plurality of spark gap devices and variable resistance devices in series. The series combination of the spark gap and varistors are generally enclosed within a hermetically sealed insulating container having one end connected to line and another end connected to ground. Upon the occurrence of a voltage surge the resulting voltage across the arrester causes the spark gaps to spark over and the varistors to become conductive. After the cessation of the overvoltage surge condition the spark gaps clear the power follow current and an open circuit condition results across the arrester terminals.

Surge voltage arresters employ a silicon carbide (SiC) material in cylindrical form as a variable resistance element and a plurality of apertured aluminum oxide discs with electrodes for providing the series spark gap stucture. The exponent n, which determines the change of resistance with voltage for varistor devices, is relatively low for SiC varistors. Since the surge arresters are continuously coupled between line and ground the spark gap structure insures that continuous current does not flow through the SiC varistor device. Continuous flow of current through a SiC varistor under steady state conditions would cause the varistor to become conductive in the absence of an overvoltage condition.

Also considered for use within voltage surge arresters are zinc oxide (ZnO) varistor devices having a high n value. Since the exponent values for ZnO varistors are substantially higher than for SiC varistors, ZnO units can provide more protection than the SiC varistors. Since ZnO varistors are not used with series gap elements continuous varistor current flows to ground causing substantial varistor heating. In order to prevent the thermal instability associated with this steady state heating the ZnO varistors are encapsulated within a heat sink and heat transfer medium to keep the ZnO material at low operating temperatures and currents. The substantial quantity of encapsulant required renders ZnO varistors infeasible for compact surge arrester applications where size is of the essence.

One patent, U.S. Pat. No. 3,778,743 issued Dec. 11, 1973 discloses the combination of a plurality of zinc oxide varistors in series with at least one spark gap for use in a lightning surge arrester. The varistors are disclosed as substitutes for silicon carbide varistors. The direct replacement of zinc oxide varistors for gapped silicon carbide varistors is not economically feasible at this time due to the greater expense involved in the materials and manufacture of zinc oxide varistors and the expense involved in the materials used within state of the art gap devices. Also disclosed within the same U.S. patent is the use of zinc oxide varistors without spark gaps but no mention is made of the thermal instability that occurs when no heat sinking is provided. However, for humidity purposes, the varistors are disclosed as embedded in epoxy and phenol resin.

The purpose of this invention is to describe a compact surge arrester employing ZnO varistors in series with miniaturized series gap devices of special construction.

SUMMARY OF THE INVENTION

The invention comprises the combination of integral control electrode series gap devices in combination with small ZnO varistor discs in a compact, operable distribution arrester.

GENERAL DESCRIPTION OF THE PRIOR ART

Figure 1:
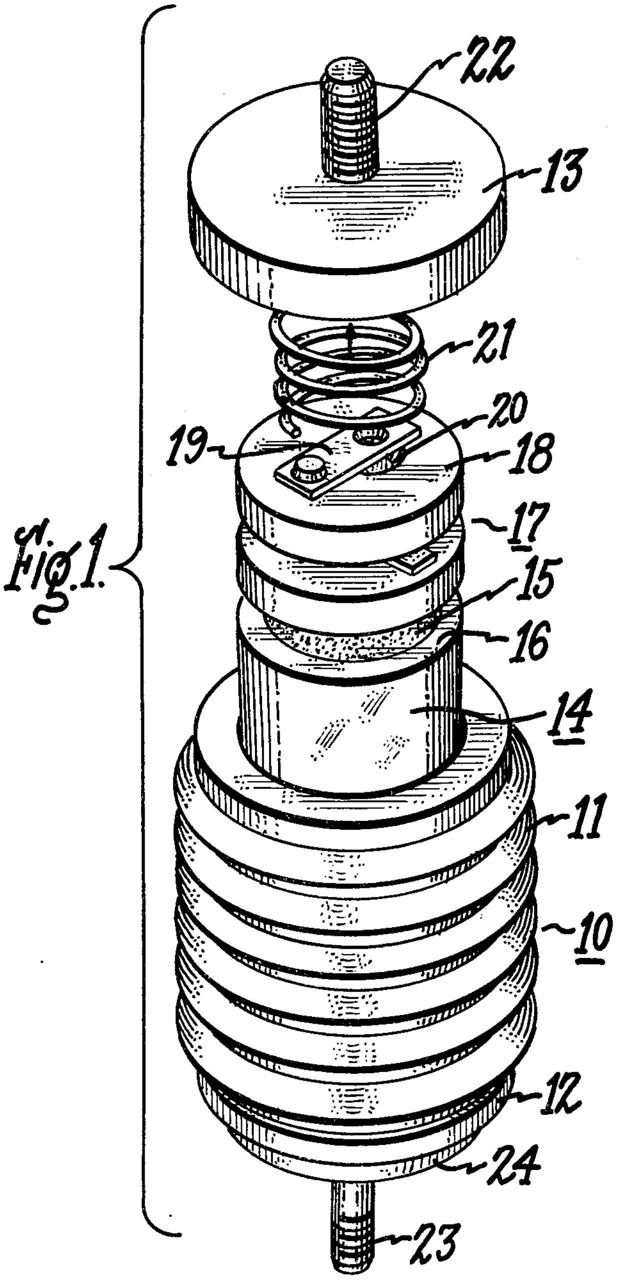
FIG. 1 is an exploded front perspective view of a SiC surge voltage arrester according to the prior art.

A voltage surge arrester 10, for use with distribution transformers, can be seen by referring to FIG. 1. A porcelain casing 11 houses of plurality of SiC varistors 14 of the type containing a sintered cylinder of SiC 15 surrounded by a ceramic collar 16. The purpose of the ceramic collar 16 is to prevent a current transfer across the perimeter of the SiC material rather than through the varistor cross section. Also contained within the casing 11 are a plurality of spark gap elements 17 consisting of aluminum oxide discs 18. The discs 18 further include a zig-zag arrangement of apertures 20 in combination with metal electrodes 19 for the transport and quenching of the arc that occurs when the arrester 10 becomes conductive. Series spark gaps are described in detail within U.S. Pat. No. 3,524,099, issued Aug. 11, 1970 and U.S. Pat. No. 3,619,708, issued Nov. 9, 1971. The spark gap assembly 17 is forced into electrical contact with the varistors 14 by means of spring 21. The porcelain casing 11 is hermetically sealed at the top end by means of cap 13 which houses connector 22 for connection with line. The arrester 10 is sealed at the opposite end by means of cap 12 generally of metal construction and including a ground disconnector unit 24 along with a ground connecting lug 23. The ground disconnector 24 is described in U.S. patent application (Stetson 5D5150) filed Feb. 6, 1978. The SiC varistor 14 is generally in the order 2" in diameter and approximately 2" high. The series gap elements 17 are also in the order of 2" in diameter and the thickness of the disc 18 is approximately ¼". The size of the SiC is to insure adequate voltage and thermal properties due to the relatively low value of the exponent as described earlier. The diameter of the disc 18 is chosen to insure an adequate current path for the varistor current upon the occurrence of an arc and to provide for adequate spacing between each successive aperture 20 within the gap structure 17 for adequate cooling and quenching of the arc.

The distribution arrester 10 of FIG. 1 provides adequate surge protection to distribution transformers but are quite bulky. The large mass of material involved can make the arresters an expensive part of the utility network. The large size and weight involved further lead to difficulties in installation, removal, and repair.

Figure 2:
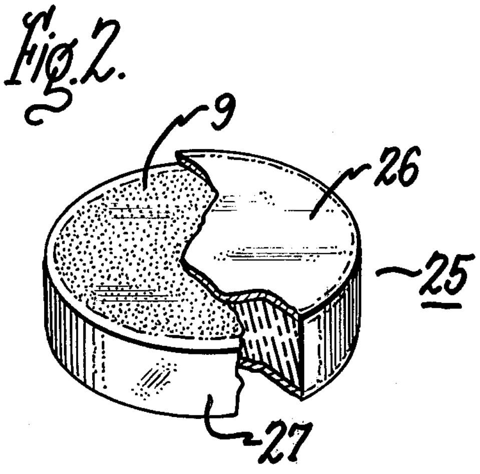
FIG. 2 is a top perspective view of a ZnO varistor.

FIG. 2 shows a compact ZnO varistor 25 of the type containing a ZnO sintered disc 9 having a metal electrode 26, on both ends, and a surrounding ceramic collar 27 as described earlier, the exponent n of zinc oxide material is in the order of 25 and is considered a high-exponent material compared to SiC having an exponent n equal approximately to from 4–5. Methods of manufacturing and treating zinc oxide varistors are disclosed within U.S. Pat. No. 3,928,245 issued Dec. 23, 1975. Since arrester devices employing zinc oxide varistors are designed for operation without series gaps, varistor current continuously flows even when the arrester is in a steady state condition. One means for removing heat generated by the varistor by the passage of varistor current is an encapsulant heat sink such as that defined as 28 in FIG. 3 for use with the zinc oxide varistor 25. The use of a silicone encapsulant heat sink is disclosed in U.S. patent application Ser. No. 778,007, filed Nov. 7, 1975. The use of the encapsulant material 28 substantially increases the overall size, weight, and cost making the encapsulated varistor unsuitable for compact arrester applications.

DESCRIPTION OF THE PREFERRED EMBODIMENT

Figure 4:
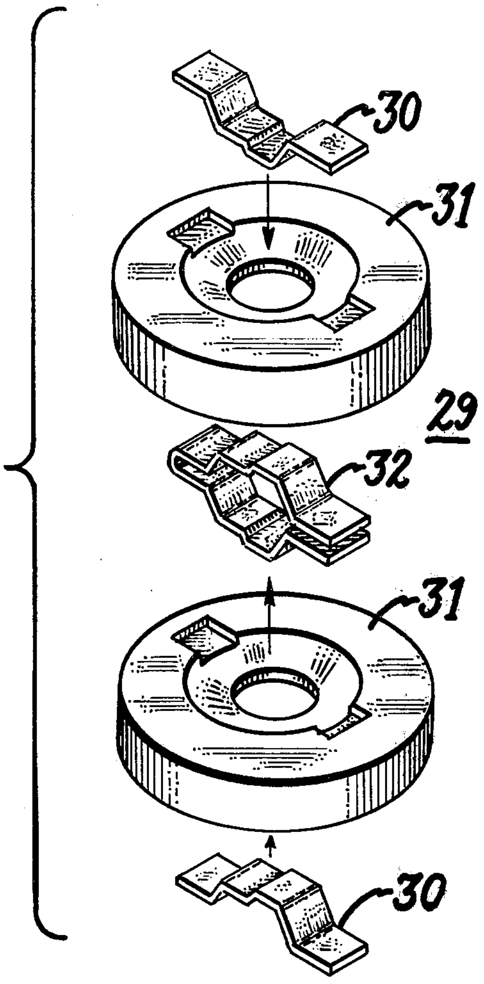
FIG. 4 is an exploded front perspective view of an integral spark gap structure.

A spark gap arrangement 29, for use with the compact distribution arrester of the invention, is shown in FIG. 4. The spark gap arrangement 29 is described in detail in U.S. patent application, Ser. No. 876,480 entitled "Integral Spark Gap Structure" filed Feb. 9, 1978 (5D5539). The novel spark gap arrangement 29 comprises a single multifunctional electrode structer 30 for forcing the arc through an apertured aluminum oxide disc 31 for cooling and quenching purposes. The spark gap arrangement 29 further includes at least one dual electrode 32 in combination with at least one other insulating disc 31 for directing the arc current to a further single electrode 30 and from there to the varistor material as described in the aforementioned U.S. patent application.

Figure 5:
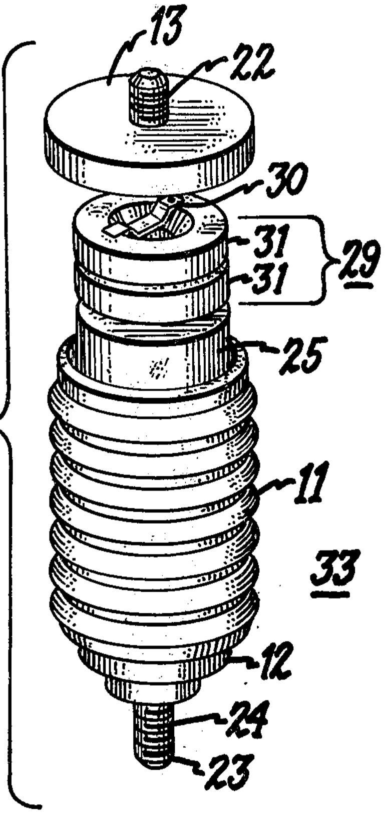
FIG. 5 is an exploded front perspective view of a compact voltage surge arrester according to the invention.
Figure 3:
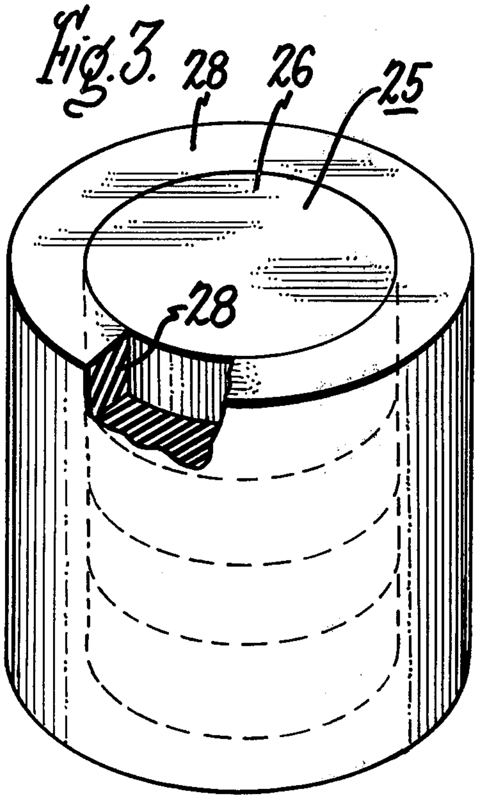
FIG. 3 is a top perspective view of the ZnO varistor of FIG. 2 including a heat sink encapsulant.

FIG. 5 shows the combination of the integral spark gap structure 29 of FIG. 4 with a small zinc oxide disc 25. The zinc oxide disc 25 is connected in series with the gap structure 29 within the procelain housing 11 and the combination is hermetically sealed within the housing 11 by means of a top cap 13. Electrical connection to line is made by a line connecting stud 22 located on the top cap 13. The casing 11 is hermetically sealed at the bottom by means of another metal cap 12 which further houses a ground disconnector 24 and a ground connecting lug 23. Since the distribution arrester 33 contains high-exponent ZnO varistors that are not continuously connected to ground but are interrupted by means of the gap structure 29 there is no continuous heating of the ZnO material. No silicone encapsulating means or other cooling device is required since current flows only when the arrester 33 becomes subjected to an overvoltage condition. The small compact size of the gap structure 29 due to its integrally constructed spark quenching properties and enables the overall arrester configuration to be substantially reduced over that of gapped SiC varistor arresters as described in FIG. 1 and over ungapped ZnO varistors as shown in FIG. 3.

Although the compact arrester of the invention is described for distribution transformer protection, this is by way of example only. The compact arrester of the invention finds application wherever small arrester devices may be required.

I claim:

1. A compact surge arrester comprising in combination:
   - a single electrode having a flat projection surface thereon for defining an extended arcing surface and a pair of flat contact surfaces thereon, one of said contact surfaces including high-electrical resistive means for limiting current flow to said one surface;
   - a double electrode structure having a first pair of opposing flat contact surfaces on one side and a second pair of flat opposing contact surfaces on another side thereof, a pair of flat projected surfaces for defining arcing surfaces, said first pair of contact surfaces being electrically coupled together;
   - a disc of electrically insulating material separating said single electrode structure and said double electrode structure and providing arc quenching means therebetween said electrodes; and
   - a plurality of zinc oxide varistors of the type consisting of a zinc oxide disc having metal electrodes at opposing ends and a ceramic collar around the periphery, wherein one of the gap electrodes is electrically coupled with line and one of the zinc oxide electrodes is electrically coupled with ground.

* * * * *